United States Patent
Garnier et al.

(10) Patent No.: US 12,545,529 B2
(45) Date of Patent: Feb. 10, 2026

(54) DEVICE AND METHOD FOR TREATING PRODUCTS

(71) Applicant: SIDEL PARTICIPATIONS, Octeville-sur-Mer (FR)

(72) Inventors: Thierry Garnier, Octeville-sur-Mer (FR); Adrien De Lescure, Octeville-sur-Mer (FR); Serge Clement, Octeville-sur-Mer (FR); Sylvain Moreau, Octeville-sur-Mer (FR); Corentin Chevet, Octeville-sur-Mer (FR)

(73) Assignee: SIDEL PARTICIPATIONS, Octville-sur-Mer (FR)

( * ) Notice: Subject to any disclaimer, the term of this patent is extended or adjusted under 35 U.S.C. 154(b) by 200 days.

(21) Appl. No.: 18/037,452

(22) PCT Filed: Nov. 23, 2021

(86) PCT No.: PCT/EP2021/082653
§ 371 (c)(1),
(2) Date: May 17, 2023

(87) PCT Pub. No.: WO2022/112234
PCT Pub. Date: Jun. 2, 2022

(65) Prior Publication Data
US 2023/0416020 A1 Dec. 28, 2023

(30) Foreign Application Priority Data
Nov. 24, 2020 (FR) ........................................ 2012045

(51) Int. Cl.
*B65G 47/91* (2006.01)
*B65G 21/20* (2006.01)

(52) U.S. Cl.
CPC ....... *B65G 47/918* (2013.01); *B65G 21/2072* (2013.01)

(58) Field of Classification Search
CPC . B25J 5/04; B25J 9/026; B25J 15/0052; B25J 15/0061; B26D 7/2628;
(Continued)

(56) References Cited

U.S. PATENT DOCUMENTS 6,286,404 B1 * 9/2001 Miglietta ............. B26D 7/2635
83/498
8,857,609 B2 10/2014 Dittli
(Continued)

FOREIGN PATENT DOCUMENTS

DE 102016106360 A1 10/2017
EP 1577052 A2 * 9/2005 ........... B26D 7/2635
(Continued)

OTHER PUBLICATIONS

International Search Report dated Feb. 24, 2022 for PCT/EP2021/082653.

*Primary Examiner* — Saul Rodriguez
*Assistant Examiner* — Brendan P Tighe
(74) *Attorney, Agent, or Firm* — Blake T. Hudson; Stephanie L. Davy-Jow

(57) ABSTRACT

Described is a device for treating products, which includes a tool and a movable support of the tool for treating products. Each support is slidably mounted along a rail and includes a blocker that can be actuated by locking, an actuator for locking and unlocking the blocker, a power supply for the actuator, at least one member for coupling with said support, a relative and indexed motorization between the member and the support. The member incorporates the actuator, allowing power to be supplied to the blocker.

13 Claims, 4 Drawing Sheets

(58) Field of Classification Search
CPC ............... B26D 7/2635; B26D 7/2642; B26D 2007/2657; B65G 21/2072; B65G 47/918
See application file for complete search history.

(56) References Cited

U.S. PATENT DOCUMENTS

| | | | | |
|---|---|---|---|---|
| 2002/0157267 | A1* | 10/2002 | Bilstein | ................ B26D 7/2621 |
| | | | | 33/41.4 |
| 2009/0071305 | A1* | 3/2009 | Myers | ................. B26D 1/0006 |
| | | | | 83/508.3 |
| 2009/0194922 | A1 | 8/2009 | Lin | |
| 2010/0218658 | A1* | 9/2010 | Myers | ................. B26D 7/2628 |
| | | | | 83/436.15 |
| 2013/0177379 | A1* | 7/2013 | Hoffman | .................. B65G 1/00 |
| | | | | 414/800 |
| 2015/0314583 | A1* | 11/2015 | Jess | .......................... B25J 11/00 |
| | | | | 414/222.01 |
| 2016/0137435 | A1* | 5/2016 | Tanaka | ................... B65G 65/00 |
| | | | | 414/800 |

FOREIGN PATENT DOCUMENTS

| | | | |
|---|---|---|---|
| EP | 2772445 | A1 | 9/2014 |
| WO | 2011145123 | A1 | 11/2011 |
| WO | 2013120462 | A2 | 8/2013 |
| WO | 2016134986 | A1 | 9/2016 |
| WO | 2016203147 | A1 | 12/2016 |
| WO | 2020211212 | A1 | 9/2020 |

* cited by examiner

DEVICE AND METHOD FOR TREATING PRODUCTS

CROSS-REFERENCE TO RELATED APPLICATIONS

This application is the 35 U.S.C. § 371 national stage of PCT application having serial number PCT/EP2021/082653, filed on 23 Nov. 2021. This application also claims priority to French application entitled having serial number 2012045 filed on 24 Nov. 2020, which are entirely incorporated herein by reference.

The present invention concerns the field of treatment of products within an industrial production line, said treatment being operated by a dedicated device.

Moreover, said treatment device must be able to treat several product formats. To do this, such a device comprises multiple tools mounted on supports which are movable between several adjustable positions according to characteristics linked to the products to be treated, such as their format or number.

Within the present invention, the term "treatment" means handling products in order to make a change of configuration to each or all of the products handled. As non-limitative examples, such treatment may comprise forming a container by folding from a cardboard cutout, or handling recipients with a view to their packing or unpacking, or adjusting the width of corridors of a conveyor transporting said products, or adjusting the spacing between two conveyors, or adjusting the positioning of a tool intended to apply adhesive to a wall of said products.

In the sense of the present invention, the term "product" includes both a recipient such as a bottle, and a container such as a cardboard box, and also a cutout intended to form such a container.

At present, for reasons of modularity, an industrial production line must be able to adapt to the characteristics linked to the products to be treated, such as different product formats, the number and/or configurations of said products.

For example, in the case of a packing treatment, the format of the box depends on the format and number of products to be inserted therein; therefore, the positions of tools used for forming such a box must be adapted, together with the tools intended for packing the products. In fact, packing six products of one format does not require the same box and same spacing between handling tools as packing twelve products of another format, in particular smaller.

Also, the modularity of the treatment may depend on the production rate imposed by a station upstream or downstream along the production line, together with the feed to such a station, such as for example feed in a single flow, a multiple flow, or in bulk, with specific intervals between products.

Here, for reasons of simplification, the characteristics linked to the products and the constraints of the production line will be globally described by the term "format". In this context, there are treatment devices comprising multiple tools mounted on supports which are movable in controllable fashion between several positions. On a change of production, the supports are moved from an initial position of tools for treatment of one product format to a final position of said tools for treatment of another product format. Once in the final position, the supports are locked for the duration of production until the next format change, when the products will be unlocked with a view to new movement.

In this case, the supports are locked and unlocked via blockers, usually pneumatic such as a ram, but also of the electric or electromagnetic type. Also, a pneumatic supply is complex to implement, requiring a circuit with sealed connections and difficult installation and routing of pneumatic pipes.

A known device comprises several supports mounted so as to be movable by sliding along a guide rail, the supports being aligned one behind the other. The supports may then be moved longitudinally to one end or the other of said rail when not locked.

In this case, the supports are locked or unlocked by the contact of blockers against said rail. For this, each support is equipped with a specific blocker. In order to lock or unlock the blocker, each support also comprises an actuator. Each actuator of each support is thus connected independently to an energy source, the controller of which makes or breaks the energy supply to the actuator so as to induce locking or unlocking of said blocker.

Also, depending on the control of the energy supply, a support may be locked by supplying energy to its actuator, while unlocking is performed by interrupting the energy supply, or vice versa.

Already, within a device, the numerous connections of separate energy supplies for each actuator of each support means that the design of said device and the installation of said connections are complex and costly, as are any interventions during maintenance.

Also, with the aim of moving the supports between the initial and final positions, their movements must be motorized in indexed fashion. Once again, the addition of a motorization specific to each support greatly complicates the design and production of the treatment device.

It has therefore been considered to combine the motorization of movement of the supports, by handling in succession each of the supports to be moved. To do this, the device is provided with a movable carriage with indexed motorization. Such a carriage shifts in parallel with the movement of the supports along said rail.

Also, such a carriage comprises an element designed for coupling with each support. The carriage is then brought opposite a support situated in the initial position, then the element is coupled to said support. Once the element is coupled, the blocker of the support is unlocked via its actuator, then said support can be moved to the final position by the indexed motorization of said carriage. In the final position, the actuator locks the support and then the element is decoupled. The carriage can then be moved in order to handle another support. In fact, the positions of a support are changed by temporary coupling with an element, depending on the movement distance required between said positions.

There is therefore a need to coordinate the handling of each support by the carriage, the coupling of the element and the control of the actuator for unlocking the blocker, so as to allow movement along said rail from the initial position to the final position in which the support is locked. Such a task must be performed with accuracy, complicating the implementation of the treatment device on the change in format of the products to be treated.

The object of the invention is to remedy the drawbacks of the prior art by proposing a product treatment device in which the supports are locked and unlocked via an external energy supply common to several supports. In fact, the invention proposes to relocate the energy supply to a common actuator, so that the blocker of each support becomes passive. The blocker of each support then becomes the slave of said actuator, acting as master, for both the energy supply of said blocker and for the movement of the corresponding support.

In fact, the invention proposes a common movable actuator which integrates the indexed motorization inducing the movement of each support once coupled and unlocked.

Thus the invention considerably simplifies the energy supply by conducting this through the movable actuator, which handles each support in succession and supplies energy to each blocker in succession.

To do this, the treatment device comprises
at least one tool and at least one movable support, said tool being mounted on said support, and said at least one tool being dedicated to the treatment of said products;
at least one rail, each support being mounted so as to slide along said rail between several positions;
each support comprising a blocker in one of said positions, said blocker being actuatable from a locking of said support resting against said rail to an unlocking allowing a movement of said support along said rail, and vice versa;
an actuator for locking and unlocking the blocker of said at least one support;
an energy supply for said actuator;
said treatment device furthermore comprising
at least one element for coupling with said at least one support;
a relative motorization between said element and said at least one support, said motorization being indexed relative to said rail.

Such a treatment device is characterized in that said element incorporates said actuator, allowing energy to be supplied to said blocker.

According to additional, non-limitative features, such a treatment device may comprise
a guide extending parallel to said rail;
said element being arranged movably along said guide under the action of said motorization.

The treatment device may comprise
a structure and a longitudinal member;
said rail being mounted movably relative to said longitudinal member of said structure under the action of said motorization ensuring movement of said rail; and advantageously
said element is mounted fixedly on said structure.

Said element may comprise at least one coupling stud, said stud being movable from a retracted configuration to a deployed position and vice versa;
said support comprising at least one coupling orifice, said orifice being shaped complementarily to said stud;
in the deployed position, said stud cooperating with said orifice for coupling of said element with said support.

The element may comprise a connecting unit connected to said energy supply;
whereas said support comprises a complementary connecting unit connected to said blocker; such that in the coupled position, the connecting unit is connected to said complementary connecting unit, said energy supply then being connected to said blocker.

Said stud may be conical in shape ensuring centering relative to the internal walls of said orifice during coupling.

Said stud may comprise said connecting element, and said orifice comprises said complementary connecting element.

Said at least one tool may be a punch, said treatment device ensuring forming of container-type products from a cardboard sheet.

Said at least one tool may be a means for handling recipient-type products, said treatment device ensuring the transfer, packing or unpacking of said products.

Said at least one tool may be a means for handling containers by holding with vacuum support against a wall of each of said containers, said treatment device ensuring the transport of said containers.

Said at least one tool may be a conveyor, said treatment device ensuring transport of said products.

Said at least one tool may be a corridor wall, said treatment device ensuring transport of said recipient-type or container-type products in corridors.

The invention furthermore concerns a method for treatment of products. Such a method is preferably intended for use of the treatment device according to the invention.

Also, the invention provides a specific function because of the centralization, at the level of said movable element, of the energy supply to the blockers of the supports. In particular, the handling of a support by the movable element requires a specific coupling phase, because the support is locked at the time of said coupling.

To do this, in such a treatment process, successively:
a relative longitudinal movement is performed between an element and a support of a tool dedicated to treatment of said products, by performing a positioning in transverse alignment between said element and said support;
said element is coupled to said support;
said element actuates the unlocking of a blocker from said support, said support being situated in an initial position along a rail;
while coupled, an indexed sliding movement of said support is performed along said rail from said initial position to a final position;
in the final position, said element actuates the locking of said blocker;
said element is decoupled.

According to additional, non-limitative features, during such a treatment method, while coupled, the actuation of the locking and unlocking of said blocker is controlled by the energy supply from said element.

At the time of coupling, said positioning of said element relative to said support, or vice versa, may be free;
then after coupling, said movement of said element fixed to said support, or vice versa, is controlled.

The positioning in transverse alignment between said element and said support may take place by detection of at least one receiver mounted on said support.

During positioning, said rail may be moved relative to said fixed element.

During positioning, said element may be moved relative to said fixed rail.

Further characteristics and advantages of the invention will arise from the detailed description below of non-limitative embodiments of the invention, with reference to the appended figures in which.

The present invention concerns the treatment of products within an industrial production line, said treatment being operated by a dedicated device.

Such treatment consists of handling the products with a view to performing a change of configuration on each or all of the products handled. As non-limitative examples, such treatment may comprise forming containers by folding from a cardboard cutout, or handling containers or recipients with a view to their packing or unpacking, or adjusting the width of corridors of a conveyor transporting said products, or adjusting the spacing between two conveyors, or adjusting the positioning of a tool intended for application of an adhesive to a wall of said products.

This treatment must be adaptable to different formats linked to production, depending on characteristics linked to the products to be treated, such as their shape or number, globally referred to below under the term "format". In fact, on changing from the first to a second production format, certain elements must be repositioned in order to correspond to the second format of products to be treated.

To this end, the invention firstly concerns a product treatment device 1, referred to below as the "device 1".

Such a device 1 comprises at least one tool 2, preferably several tools 2.

As stated above, the tool 2 is dedicated to the treatment to be applied to the products. In non-limitative fashion, said tool 2 may be:

a punch, said device 1 then forming said container-type products from a cardboard sheet;

a means of handling recipient-type products, said device 1 ensuring the transfer, packing or unpacking of said products; said handling means may comprise bell-shaped holders;

a means of handling containers by holding with vacuum support against a wall of each of said containers, said device 1 ensuring the transport of said containers; said handling means may comprise suckers;

a conveyor, said device 1 ensuring transport of said products;

or a corridor wall, said device 1 ensuring transport in corridors of said recipient-type or container-type products.

The device 1 also comprises at least one support 3. Said tool 2 is mounted on said support 3. Furthermore, one or more tools 2 may be mounted on a same support 3. In fact, a tool 2 is removably fixed to its support 3 so that the tool 2 can be changed if necessary, depending on a specific format of products to be treated, for maintenance or replacement.

Figure 1:
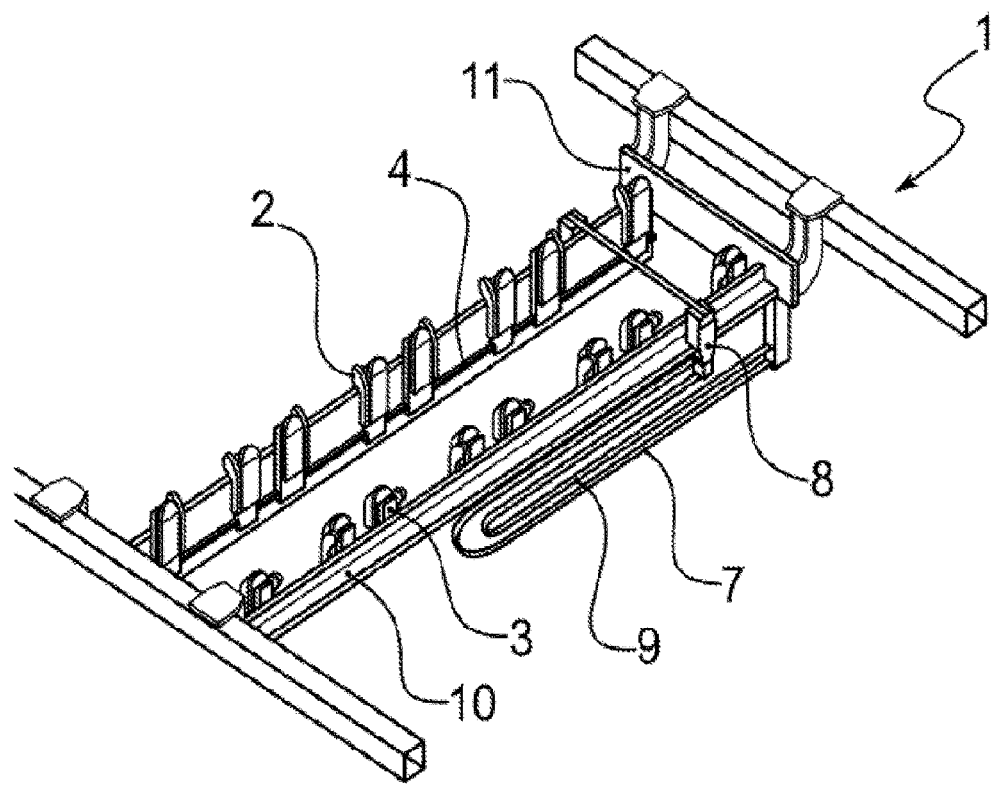
FIG. 1 shows schematically a perspective view of an embodiment of the treatment device intended for forming containers by folding from cardboard cutouts, showing in particular on each side several punch-type tools mounted on sports which are movable along two rails, while only a single element is mounted movably along a guide.

In the embodiment shown on FIG. 1, a support 3 receives two tools 2 in the form of punches intended to perform part of the forming of the container from a cardboard cutout. Multiple punches are necessary to fold each sheet in order to form a cardboard box, said punches being precisely spaced relative to the dimensions of the sheet and the box to be formed.

The support 3 is therefore movable. On a change of production format, each support 3 may then be moved so as to adjust the distance between the tools 2.

Figure 2:
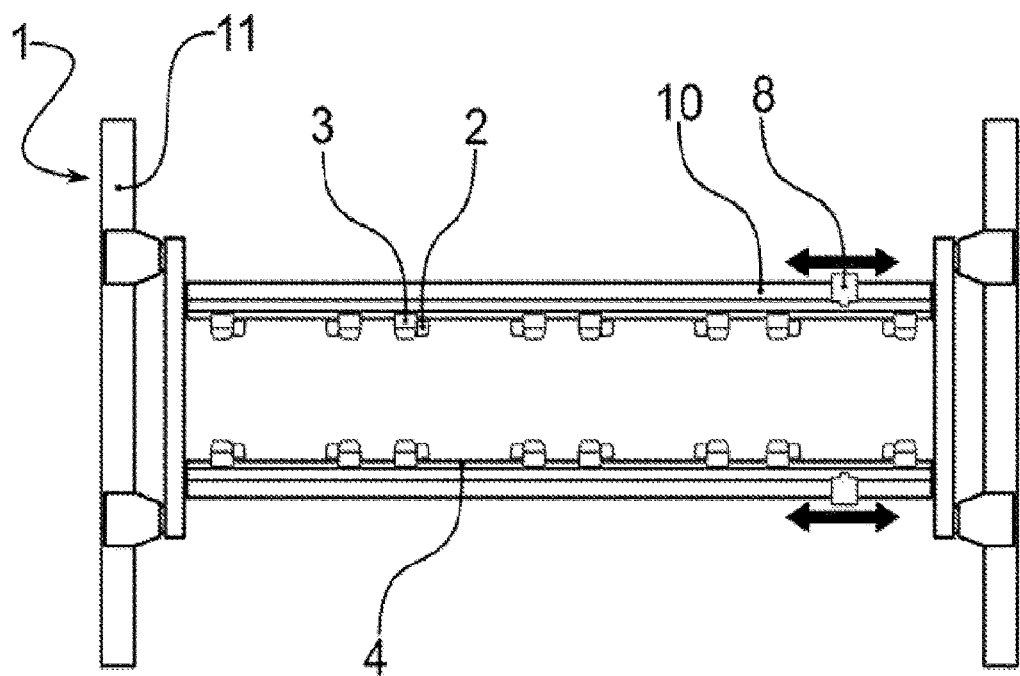
FIG. 2 shows schematically a side view of FIG. 1, showing in particular the longitudinal direction of movement of the supports along the rails and the movement of said elements along the respective guide.

To do this, the device 1 comprises at least one rail 4. In the embodiment shown in FIGS. 1 and 2, the device 1 comprises a pair of rails 4 arranged in parallel.

Furthermore, each support 3 is mounted so as to slide along a rail 4 between several positions. A support 3 may therefore be moved along its rail 4 on which it slides longitudinally.

To this end, in the context of the present invention, unless specified otherwise, the term "longitudinal" relates to the direction of sliding along said rail 4.

Thus unless specified otherwise, the term "transverse" corresponds to a direction orthogonal to said sliding direction in the same plane, preferably a horizontal or substantially horizontal plane, in particular containing said rail 4.

A support 3 may therefore be moved longitudinally along said rail 4 and positioned at a location in a position on said rail 4. The support 3 may be likened to a carriage mounted on said rail. Such a carriage may be intended to roll via suitable rolling means, or slide via a suitable low-friction surface. Such a carriage may in particular be attached by nesting on said rail 4, the two components then having complementary forms.

Moreover, each support 3 comprises a blocker 5 in one of the positions. This blocker 5 can be actuated from a locking of said support 3 resting against said rail 4, to an unlocking allowing movement of said support 3 along said rail, and vice versa. In fact, the blocker 5 may be actuated to block the support 3 in a precise position along the rail 4, and unblock it to move said support 3 along said rail 4. When unlocked, the support 3 has a freedom of longitudinal movement, whereas it cannot be moved when locked, i.e. fixed to said rail 4.

In one embodiment, said blocker 5 may comprise a movable part which rests against at least one surface of said rail 4, the support force applied ensuring a resistance preventing the sliding of said support 3. In fact, the blocker 5 may be deployed to lock the support 3 against the rail 4, and conversely retracted to ensure unlocking of said support 3.

In various embodiments, the blocker 5 may be of the mechanical, electric, hydraulic, pneumatic, magnetic, or electromagnetic type.

Preferably, the blocker 5 is pneumatic, similar to a ram. Such a pneumatic blocker 5 may be supplied with pressurized fluid, in particular compressed air.

The device 1 thus comprises an actuator 6 for locking and unlocking the blocker 5 of said at least one support 3. This actuator 6 controls the deployment of the blocker 5 for locking, and vice versa. In fact, the actuator 6 acts as a switch ensuring that the blocker 5 receives or does not receive energy for deployment or retraction. Preferably, when the actuator 6 supplies energy to said blocker 5, the latter is unlocked, while when the actuator 6 does not supply energy, the blocker 5 is locked; the reverse is also conceivable.

The device 1 also comprises an energy supply 7 for said actuator 6. This supply 7 is connected to the actuator 6 and supplies energy continuously to said actuator 6, which delivers or does not deliver energy to said blocker 5 for the unlocking or locking of said blocker 5.

Preferably, in the case of hydraulic or pneumatic energy, the actuator 6 may comprise a solenoid valve.

Also, on a format change, it may be necessary to move the support 3 by unlocking it from the rail 4 and repositioning it at a new position depending on the new format to be produced.

To do this, the device 1 also comprises at least one element 8 for coupling to said at least one support 3. This element 8 is temporarily fixed to each support 3 in order to move it when unlocked, before said support 3 is placed in the new position and locked again.

Advantageously, said element 8 incorporates said actuator 6, allowing it to supply energy to said blocker 5. In fact, the actuator 6 is mounted on the element 8 and connected to the energy supply 7, whereas the blocker 5 is not energized except via said element 8. Then in relation to energy supply, the blocker 5 is passive and the element 8 becomes active, acting as master with the blocker 5 as slave. Such a configuration in particular means that it is no longer necessary to connect each blocker 5 but only the element 8 to the energy supply 7, which considerably simplifies the design, production, mounting and wiring, in particular when there are numerous supports 3 to be energized. Also, the energy supply to each blocker 5 depends on the element 8, and the supports 3 can only be moved one at a time, each in turn under the action of the coupled element 8.

It is noted that the handling and movements of each of the supports 3 by the element 8 may be determined according to a suitable configuration. In particular, software means allow management of the recording of the positions of each support 3 and the movements to be applied to each, depending on the production format. Also, such a configuration ensures handling of a first support 3 for moving to a new position without interfering with another support 3 positioned elsewhere along the rail 4. It is thus possible to adjust the position of each support 3 and intervene in a precise order on each so as to reposition it correctly. Such a function may in particular avoid steps of moving all supports 3 to an end position of said rail 4, before returning to position them one by one at their new positions, which would lead to excessively long movement times and travels.

Moreover, the device 1 comprises a relative motorization 9 between said element 8 and said support 3. In other words, the motorization 9 allows the element 8 to be moved relative to the support 3, or the support 3 to be moved relative to the fixed element 8; the term "relative" refers to movement in the longitudinal direction between the support 3 and the element 8.

According to embodiments shown on FIGS. 1, 2, 5 and 7, the device 1 comprises a guide 10 extending parallel to said rail 4. Also, said element 8 is movable along said guide 10 under the action of said motorization 9. Thus the movement of the element 8 along its guide allows positioning for collecting each support 3 in order to move it and position it in its new position.

According to one embodiment, said element 8 resembles a carriage, like the corresponding embodiment of said support 3.

Figure 4:
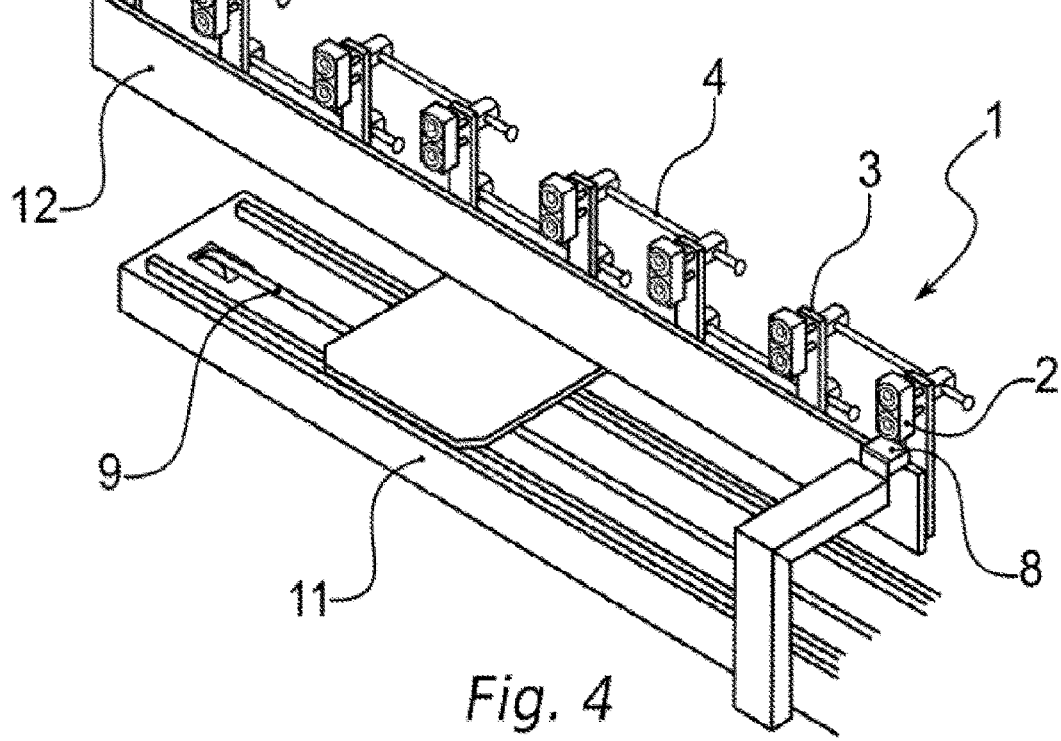
FIG. 4 shows schematically in perspective an embodiment of a treatment device intended for handling containers by vacuum support against their side wall, showing in particular on one side multiple sucker-type tools mounted on supports which are movable along rails mounted on a longitudinal member which is itself movable relative to the structure, while a single element is fixed to said structure.
Figure 6:
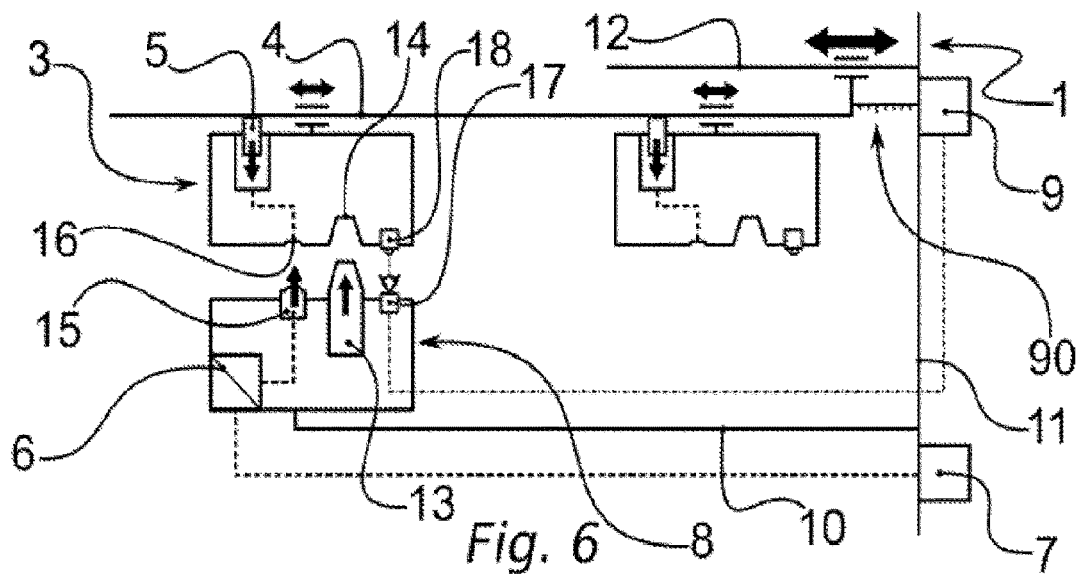
FIG. 6 shows schematically a view similar to FIG. 5 of a second embodiment, showing in particular two supports movable in the locked position along a rail which is movable along a longitudinal member with indexed motorization, while an element is fixed rather than movable along its guide.

According to other embodiments shown on FIGS. 4 and 6, the device 1 comprises a structure 11 and a longitudinal member 12. Furthermore, said rail is mounted movably relative to said longitudinal member 12 of said structure 11 under the action of said motorization 9. In fact, said motorization ensures the movement of said rail 4. This movability of the longitudinal member 12 is longitudinal. In addition, said element 8 is mounted fixedly on said structure 11. Thus the movement of the rail 4 along the longitudinal member 12 allows the positioning of each support 3 opposite the element 8 for coupling and then repositioning of said support 3, after coupling and while unlocked, to its new position by movement of said rail 4 relative to the element 8 which does not move.

Also, said motorization 9 is indexed relative to said rail 4. In fact, the motorization 9 is controlled to ensure precise knowledge of the position of the element moved, being either the rail 4 and the corresponding support 3, or the element 8. In other words, as shown on FIGS. 5 to 7, the motorization 9 has a reference 90 relative to the structure 11, so that the longitudinal coordinate of each position can be known. In particular, the motorization 9 is indexed relative to a reference point situated at one end of the structure 11, preferably the end at which said structure 11 joins said rail 4, said guide 10 or said longitudinal member 12.

According to one embodiment, the indexed motorization 9 takes the form of at least one servomotor, in particular of the asynchronous or brushless motor type, or a linear motor, and in all cases with a position reader of the "coder" type.

As stated above, the element 8 allows handling of each support 3 in order to reposition it. This handling takes place by coupling of said element 8 to said support 3.

Figure 3:
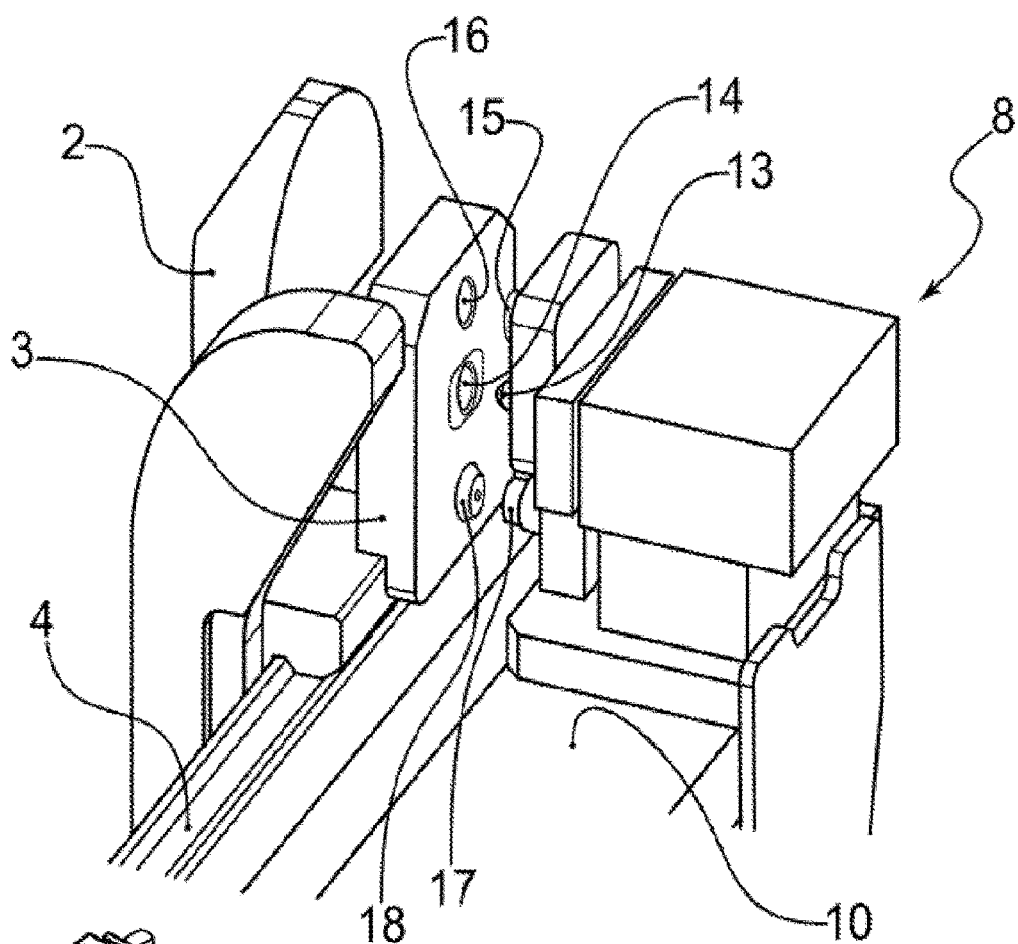
FIG. 3 shows schematically in perspective a detail from FIG. 1, showing in particular a support locked to its rail, opposite an element in the decoupled position.

According to one embodiment, shown in particular on FIG. 3, said element 8 comprises at least one coupling stud 13. Furthermore, said support 3 comprises at least one coupling orifice 14, said orifice 14 being complementary in shape to said stud 13. Thus the stud 13 may be inserted inside the orifice 14 so that the support 3 and the element 8 are fixed together, neither being able to move without the other, and solely under the action of said motorization 9.

Also, said stud 13 is movable from a retracted position to a deployed position and vice versa, in particular via a dedicated controller.

According to one embodiment, said stud 13 is conical in shape to ensure centering relative to the internal walls of said orifice 14 during coupling. In complementary fashion, the orifice 14 then comprises walls converging from outside to inside following the insertion direction of said stud 13, namely transversely. Thus if the support 3 and element 8 are not perfectly transversely aligned at the time of coupling, the specific shape of the stud 13 allows centering at the time of insertion of the stud 13 within said orifice 14. Then the centering via the stud 13, cooperating with the orifice 14, essentially ensures centering in the longitudinal direction, the elements being situated at fixed heights relative to the rail 4 and guide 10.

Also, at the time of coupling, said positioning of said element 8 relative to said support 3, or vice versa, may be freed so as to allow freedom of movement of the one relative to the other, thus avoiding a resistance arising from the locking of said support 3 on the rail 4 at the time of coupling. In other words, at the time of coupling, in the case of a movable element 8, the movement of said element 8 along its guide 10 is free, while in the case of a fixed element 8, the movement of said support 3 locked on the longitudinal member 12 is freed, namely allowing the longitudinal movement of said longitudinal member 12 relative to the structure 11.

Then after coupling, said movement of said element 8 fixed to said support 3, or vice versa, is controlled. In other words, after coupling, in the case of a movable element 8, the movement of said element 8 along the guide 10 is controlled, while in the case of a fixed element 8, the movement of said support 3 (then unlocked) along the rail 4 is controlled, namely by controlling the longitudinal movement of said rail 4 relative to the longitudinal member 12 of the structure 11.

Also, these controlled movements take place via indexed motorization 9. Then if the freedom of movement during coupling leads to a movement, even minimal, of said element 8 or support 3, the indexing of the motorization 9 allows correction of any shift.

Also, indexing of the motorization 9 allows the position of each support 3 along the rail 4 to be known, in particular after each of them has been handled once by the element 8, or if the initial position of each support 3 has first been registered.

According to one embodiment, the device 1 comprises means for detection of each support 3 by the element 8. Such detection in particular allows the initial position of each support 3 to be determined for a first time.

According to one embodiment, the element 8 is equipped with a detection cell 17, while each support 3 is equipped with a corresponding suitable receiver 18. Also, said cell 17 and said receiver 18 are positioned to allow the cell 17 to detect said receiver 18, in particular transversely in a horizontal or substantially horizontal plane. Such detection is visible in particular on FIG. 9.

Also, the detection means are connected to the indexed motorization 9 so that the movement of the element 8 or support 3 stops the moment a receiver 18 is reliably detected by cell 17.

Similarly, detection may comprise identification information allowing interpretation of data relating to the support 3, such as e.g. the sequencing of a support 3 along the rail 4 relative to other adjacent supports 3. This identification of a support 3 means that it is handled only if the final position of said support 3 to be moved does not interfere with another adjacent support 3.

Also, the movements of the various supports 3 may be managed via suitable software means running on a control console and equipped with suitable data processing means.

Such a console in particular manages the indexed motorization 9 and the activation of said actuator 6.

As stated above, the energy supply 7 is connected to the element 8 supplying the block 5 of each support 3 independently.

According to one embodiment, said element 8 comprises a connecting unit 15 connected to said energy supply 7. Furthermore, the support 3 comprises a complementary connecting unit 16 connected to said blocker 5. In the coupled position, the connecting unit 15 is connected to the complementary connecting unit 16, said energy supply 7 then being connected to said blocker 5, in particular via said actuator 6.

According to various embodiments, depending on the type of energy supply, the connecting unit 15 and the complementary connecting unit 16 may be electrical connectors such as male and female terminals, hydraulic or pneumatic connectors. In particular, in the case of the latter connectors, these are equipped with means to ensure the coupling tightness.

Figure 5:
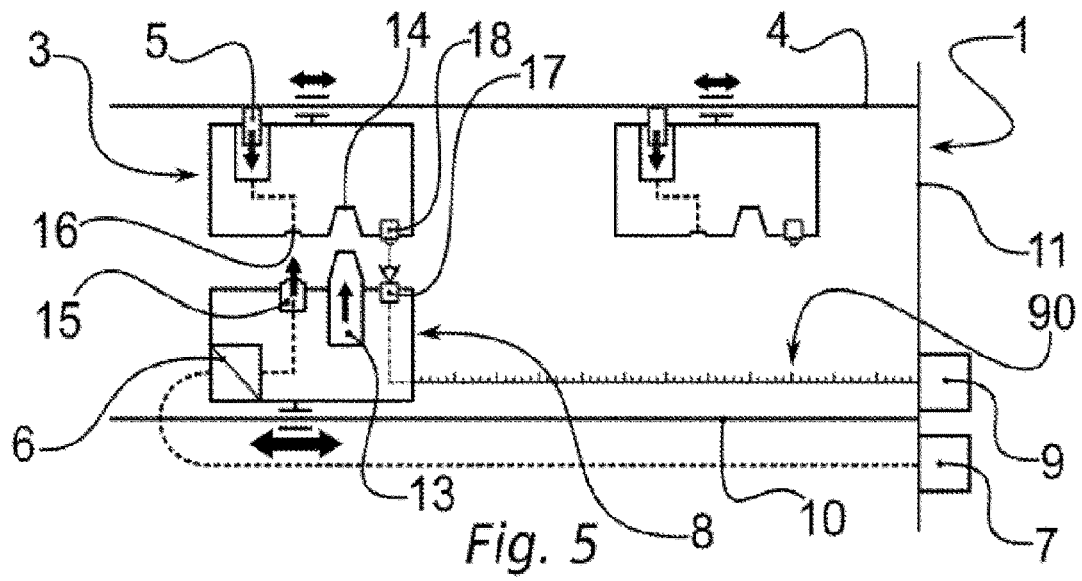
FIG. 5 shows schematically in simplified view a first embodiment, showing in particular two movable supports in the locked position along a rail, while an element is movable along its guide with indexed motorization, showing certain movements of the various components.

According to an embodiment as shown in FIGS. 5 and 6, the connecting unit 15 is separate from said stud 13.

Figure 7:
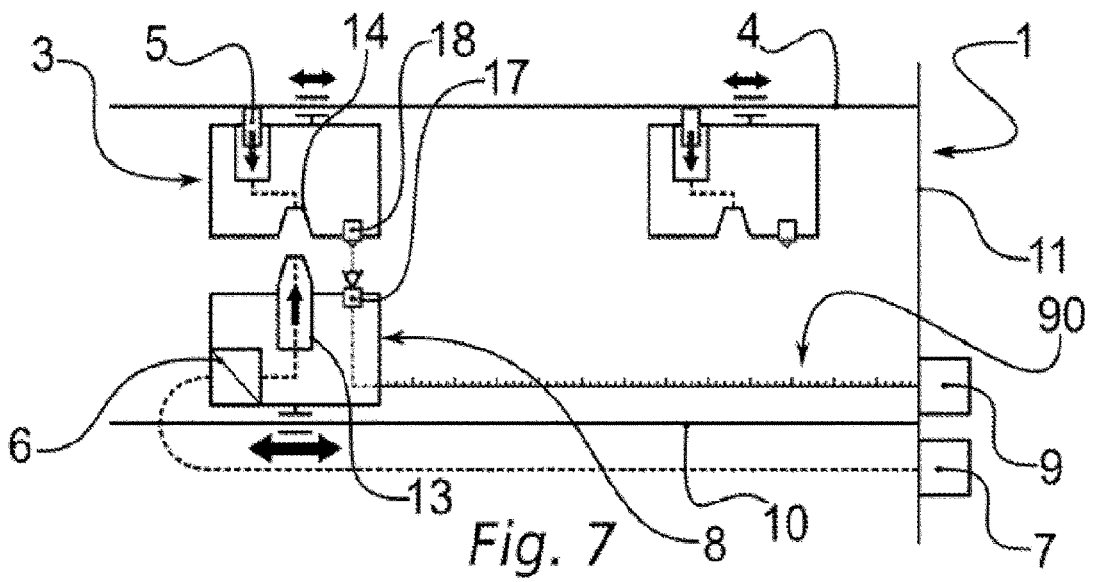
FIG. 7 shows schematically a view similar to FIG. 5 of a third embodiment, showing in particular an element provided with a connecting unit ensuring an energy supply to the blocker of the support in the coupled position.
Figure 8:
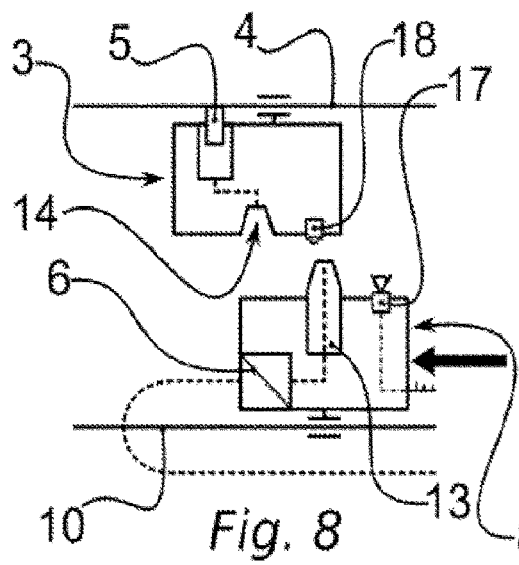
FIG. 8 shows schematically a detail view of FIG. 7 in a first position, showing in particular the movement of the element under the action of the indexed motorization.

According to another embodiment shown in FIG. 7, said stud 13 comprises said connecting unit 15, and said orifice 14 comprises said complementary connecting unit 16.

The invention also concerns a method for treatment of products, referred to below as the "method". Such a method is preferably used to implement the treatment device 1 described above.

The method comprises several successive, non-limitative steps.

Firstly, a relative longitudinal movement is performed between an element 8 and the support 3 of a tool 2 dedicated to the treatment of said products, by positioning said element 8 and said support 3 in transverse alignment.

In particular, the relative movement corresponds to the movement of the element 8 along its guide 10 relative to the support 3 locked onto the rail 4, or to the movement of the longitudinal member 12, on which said support 3 is locked, relative to the fixed element 8.

According to one embodiment, during positioning, said rail 4 is moved relative to said fixed element 8.

According to another embodiment, during positioning, said element 8 is moved relative to said fixed rail 4.

Then said element 8 is coupled to said support 3.

Then said element 8 actuates the unlocking of a blocker 5 of said support 3, said support 3 being situated in an initial position 19 along a rail 4.

While coupled, said support 3 is moved in indexed fashion by sliding along said rail 4 from said initial position 19 to a final position 20.

Once in the final position 20, the blocker 5 is locked by actuation by said element 8.

Then said element 8 is decoupled.

These steps may be repeated, in particular for successive handling of multiple supports 3.

Some of these steps are shown on FIGS. 8 to 13.

According to an embodiment, while coupled, the locking and unlocking of said blocker 8 is controlled via the energy supply from said element 8. The blocker 5 is then the slave of the element 8, in particular via its actuator 6 connected to an energy supply 7.

According to an embodiment, at the time of coupling, said positioning of said element 8 relative to said support 3, or vice versa, is free. This freedom of movement at the time of coupling avoids any damage of elements, intended to cooperate with one another, because of the locking of the support 3.

Figure 10:
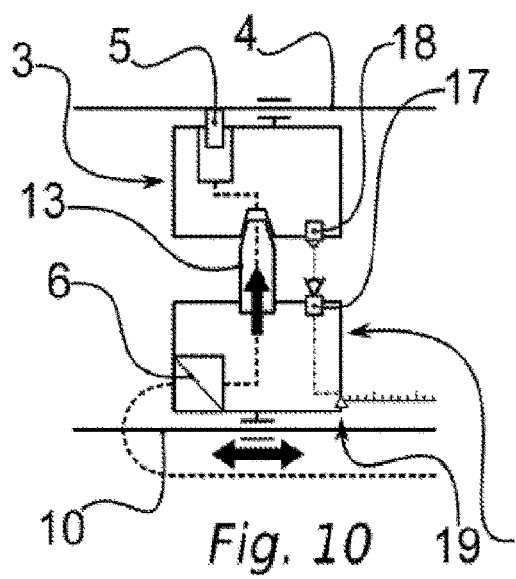
FIG. 10 shows schematically a view similar to FIG. 8 in a third position, showing in particular the coupling of the element to the support with freedom of movement of said element along its guide.
Figure 11:
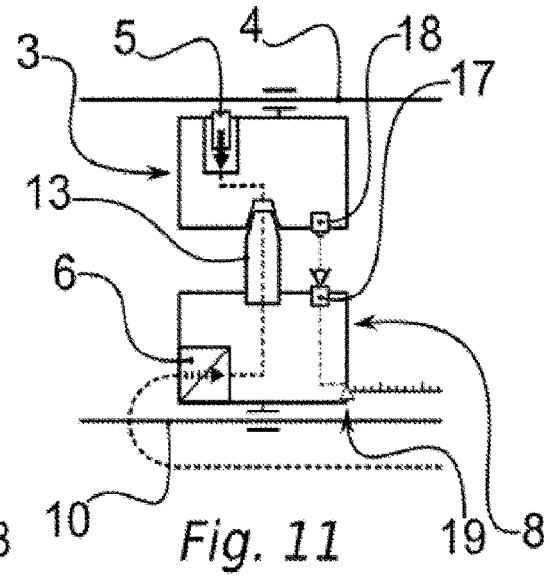
FIG. 11 shows schematically a view similar to FIG. 8 in a fourth position, showing in particular the energy supply to the blocker of the support while coupled, and its unlocking.
Figure 12:
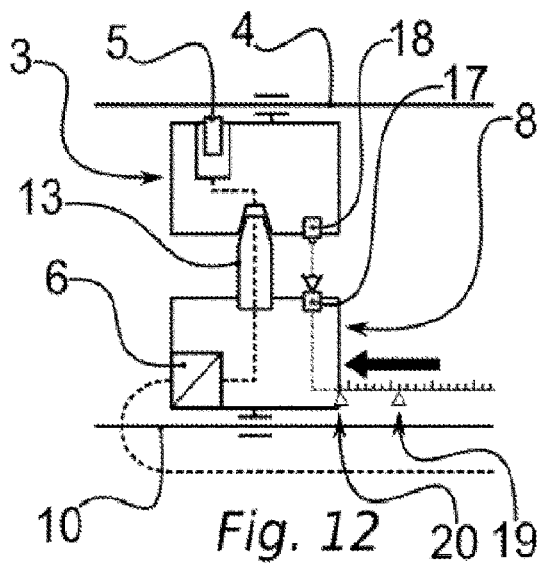
FIG. 12 shows schematically a view similar to FIG. 8 in a fifth position, showing in particular the movement of said element while coupled with said support, under the action of the indexed motorization.
Figure 13:
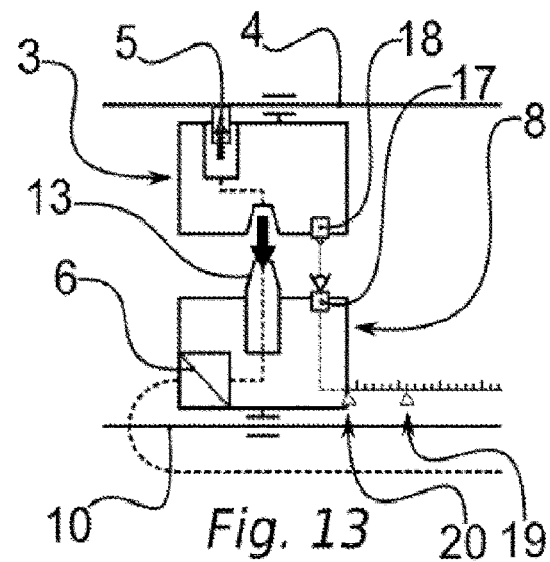
FIG. 13 shows schematically a view similar to FIG. 8 in a sixth position, showing in particular the locking of said blocker and the decoupling of said element.

Such freedom of movement at the time of coupling is shown in particular on FIG. 10.

More precisely, in the case of a fixed element 8, the longitudinal movement of the rail 4 relative to the longitudinal member 12 is free, while when the rail 4 is fixed, the longitudinal movement of said element 8 relative to its guide 10 is free.

Then after coupling, said movement of said element 8 fixed to said support 3, or vice versa, is controlled.

Also, the above-mentioned freedom of movement and control of the movement are ensured by the indexed motorization 9.

According to an embodiment, the positioning in transverse alignment between said element 8 and said support 3 is carried out by detection of at least one receiver 18 mounted on said support 3.

Also, such detection is operated by a cell 17 mounted on the element 8.

Figure 9:
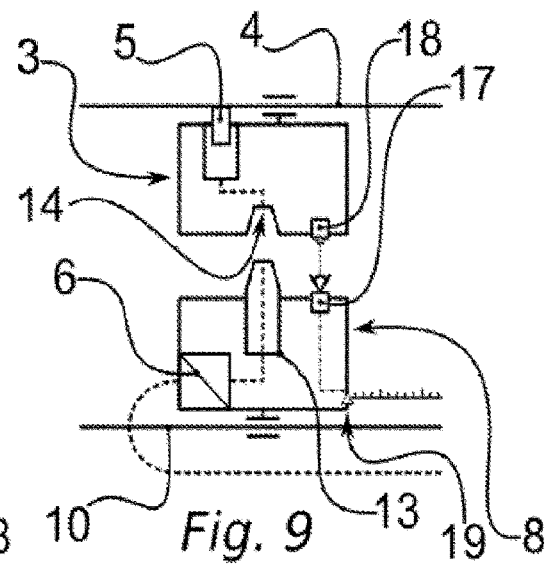
FIG. 9 shows schematically a view similar to FIG. 8 in a second position, showing in particular the stoppage of said element opposite a support by detection of said support.

Such a detection step is shown in particular on FIG. 9. This detection allows determination of the "mutually facing position" of the element 8 and support 3 to be handled, namely that these elements are indeed in transverse alignment, in particular with the stud 13 and orifice 14 situated at the same level in the longitudinal direction.

Also, such detection provides the real positions of all supports 3 in order to verify and if necessary correct an initial positioning during mounting. This detection may also be carried out on each change of production format, but preferably coupled to a recording of positions of each support 3, with the aim of using these known positions later on the next change of production format.

Thus by transferring the energy supply to the element 8, the invention allows considerable simplification of mounting of the device 1, with each support 3 to be moved during a change of production format being subject to the blocker 5.

Furthermore, the invention allows the movements of each support 3 to be optimized, via the difference between the initial position 19 and the final position 20, in a precise order, taking into account the interference between adjacent supports 3.

The invention claimed is:

1. A device (1) for treating products, comprising:
    at least one tool (2) and at least one movable support (3), said tool (2) being mounted on said support (3), and said at least one tool (2) being dedicated to the treatment of said products;
    at least one rail (4), each support (3) being mounted so as to slide longitudinally along said rail (4) between several positions;
    each support (3) comprising a blocker (5) in one of said positions, said blocker (5) being actuatable from a locking state of said support (3) resting against said rail (4) to an unlocking state allowing a longitudinal movement of said support (3) along said rail (4), and vice versa;
    a common actuator (6) for locking and unlocking the blocker (5) of each said at least one support (3);
    an energy supply (7) for said actuator (6);
    said treatment device (1) furthermore comprising
    at least one element (8) configured to couple with said at least one support (3), wherein the at least one element is temporarily fixed to the at least one support to move the at least one support longitudinally in the unlocking state;
    a relative motorization (9) between said element (8) and said at least one support (3), said motorization being indexed relative both to said rail (4) and to a reference point;
    wherein
    said element (8) incorporates said common actuator (6), allowing energy to be supplied to each said blocker (5), and wherein a position of each individual support is repositionable by the element between the several positions along the rail independently without repositioning other supports.

2. The treatment device (1) according to claim 1, comprising:
    a guide (10) extending parallel to said rail (4);
    said element (8) being arranged movably along said guide (10) under the action of said motorization (9).

3. The treatment device (1) according to claim 1, comprising:
    a structure (11) and a longitudinal member (12);
    said rail (4) being mounted movably relative to said longitudinal member (12) of said structure (11) under the action of said motorization (9) ensuring movement of said rail (4); and
    wherein said element (8) is mounted fixedly on said structure (11).

4. The treatment device (1) according to claim 1, wherein:
    said element (8) comprises at least one coupling stud (13), said stud (13) being movable from a retracted configuration to a deployed position and vice versa;
    said support (3) comprises at least one coupling orifice (14), said orifice (14) being shaped complementarily to said stud (13); and
    in the deployed position, said stud (13) cooperated with said orifice (14) for coupling of said element (8) with said support (3).

5. The treatment device (1) according to claim 1, wherein:
    said element (8) comprises a connecting unit (15) connected to said energy supply (7);
    said support (3) comprises a complementary connecting unit (16) connected to said blocker (5); and
    in the coupled position, the connecting unit (15) is connected to said complementary connecting unit (16), said energy supply (7) then being connected to said blocker (5).

6. The treatment device (1) according to claim 4, wherein:
    said stud (13) is conical in shape, ensuring centering relative to the internal walls of said orifice (14) during coupling.

7. The treatment device (1) according to claim 5, wherein:
    said stud (13) comprises said connecting element (15) and said orifice (14) comprises said complementary connecting element (16).

8. The treatment device (1) according to claim 1, wherein:
    said at least one tool (2) is a punch, said treatment device (1) ensuring forming of container-type products from a cardboard sheet.

9. The treatment device (1) according to claim 5, wherein:
    said stud (13) is conical in shape, ensuring centering relative to the internal walls of said orifice (14) during coupling.

10. The treatment device (1) according to claim 1, wherein:

said at least one tool (2) is a means for handling recipient-type products, said treatment device (1) ensuring the transfer, packing or unpacking of said products.

11. The treatment device (1) according to claim 1, wherein:

said at least one tool (2) is a means for handling containers by holding with vacuum support against a wall of each of said containers, said treatment device (1) ensuring the transport of said containers.

12. The treatment device (1) according to claim 1, wherein:

said at least one tool (2) is a conveyor, said treatment device (1) ensuring transport of said products.

13. The treatment device (1) according to claim 1, wherein:

said at least one tool (2) is a corridor wall, said treatment device (1) ensuring transport of said recipient-type or container-type products in corridors.

* * * * *